No. 636,095. Patented Oct. 31, 1899.
A. ADAMS.
SEMIDRY OR SEMIPLASTIC BRICK MAKING MACHINE.
(Application filed Dec. 28, 1898.)

(No Model.) 10 Sheets—Sheet 1.

Fig. 1.

Witnesses:
Inventor:
Adam Adams.
by Wm. H. Kinnicutt
his Atty.

THE NORRIS PETERS CO., PHOTO-LITHO., WASHINGTON, D. C.

Fig. 1.

No. 636,095. Patented Oct. 31, 1899.
A. ADAMS.
SEMIDRY OR SEMIPLASTIC BRICK MAKING MACHINE.
(Application filed Dec. 28, 1898.)
(No Model.) 10 Sheets—Sheet 5.

Witnesses:
E. A. Fincinell.
Nellie Callahan.

Inventor:
Adam Adams,
by Wm. H. Fincinell.
his Atty.

No. 636,095. Patented Oct. 31, 1899.
A. ADAMS.
SEMIDRY OR SEMIPLASTIC BRICK MAKING MACHINE.
(Application filed Dec. 28, 1898.)

(No Model.) 10 Sheets—Sheet 6.

Witnesses: Inventor.

No. 636,095. Patented Oct. 31, 1899.
A. ADAMS.
SEMIDRY OR SEMIPLASTIC BRICK MAKING MACHINE.
(Application filed Dec. 28, 1898.)
(No Model.) 10 Sheets—Sheet 7.

Witnesses:

Inventor.
Adam Adams.
by Wm H. Fincuel
his Atty.

No. 636,095. Patented Oct. 31, 1899.
A. ADAMS.
SEMIDRY OR SEMIPLASTIC BRICK MAKING MACHINE.
(Application filed Dec. 28, 1898.)

(No Model.) 10 Sheets—Sheet 8.

No. 636,095. Patented Oct. 31, 1899.
A. ADAMS.
SEMIDRY OR SEMIPLASTIC BRICK MAKING MACHINE.
(Application filed Dec. 28, 1898.)

(No Model.) 10 Sheets—Sheet 9.

Witnesses:
Inventor:
Adam Adams

No. 636,095. Patented Oct. 31, 1899.
A. ADAMS.
SEMIDRY OR SEMIPLASTIC BRICK MAKING MACHINE.
(Application filed Dec. 28, 1898.)
(No Model.) 10 Sheets—Sheet 10.

Witnesses:
E. A. Bincrel
Nellie Callahan.

Inventor.
Adam Adams.
by Wm. H. Bincrel
his Atty.

UNITED STATES PATENT OFFICE.

ADAM ADAMS, OF PETERBOROUGH, ENGLAND.

SEMIDRY OR SEMIPLASTIC BRICK MAKING MACHINE.

SPECIFICATION forming part of Letters Patent No. 636,095, dated October 31, 1899.

Application filed December 28, 1898. Serial No. 700,521. (No model.)

*To all whom it may concern:*

Be it known that I, ADAM ADAMS, a subject of the Queen of Great Britain, residing at Old Hetton, Peterborough, in the county of Huntingdon, England, have invented an Improved Semidry or Semiplastic Brick Making Machine, of which the following is a full, clear, and exact description, and for which I have made application for British Patent No. 12,851, dated the 8th of June, 1898.

I provide a circular drum or cylinder, which revolves continuously and contains the molds in which the material is to be pressed. There is a bottom head or plunger to each mold or set of molds, and these receive their motion by means of a fixed cam, around which they revolve with the cylinder. The top heads or plungers, each or each pair of which enters every other mold or pair of molds once during a revolution, travel with the cylinder while they give their pressures, after which they are carried back to their former position automatically. The motion of the top heads or plungers, apart from their circular movement, is arranged to be given by eccentrics driven at the correct speed and in the right direction in relation to the cylinder and transmitted through toggle-levers or other mechanical arrangement. Having received the proper pressure and shape, the bricks are pushed out of the molds by the bottom heads and are carried on to the table or belt by a rocking arm or similar contrivance. The heads, both top and bottom, are steam-heated.

This machine does not waste a single portion of its stroke, and so can turn out twice the usual number of bricks and still remain for a longer period on each one with a much slower movement of working parts.

My invention is illustrated in the accompanying drawings, in which—

Fig. 7 is an elevation, on a reduced scale, of the machine with driving-gear, one side of frame, and one pair of eccentrics removed, showing the segment-retaining straps and also arrangement for regulation of feed. Fig. 8 is an elevation, and Fig. 9 a plan, of one pair of molds. Fig. 12 is a front elevation, and Fig. 13 a side elevation, of top plunger. Fig. 14 is a front elevation of catch on eccentric-arm; and Fig. 15, a side elevation, partly in section, drawn on the line 15 15 of Fig. 14. Fig. 16 is a section of a portion of cylinder-frame, showing one of the catches; and Fig. 17 is a plan of same.

Figures 8, 9, 12, 13, 14, 15, 16, 17:
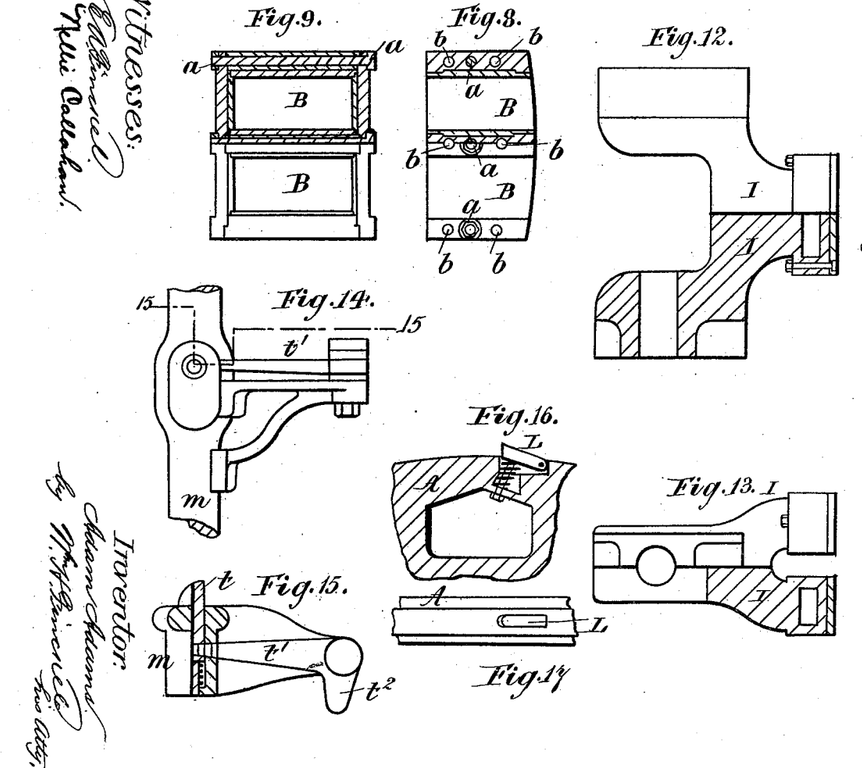
Figure 9:
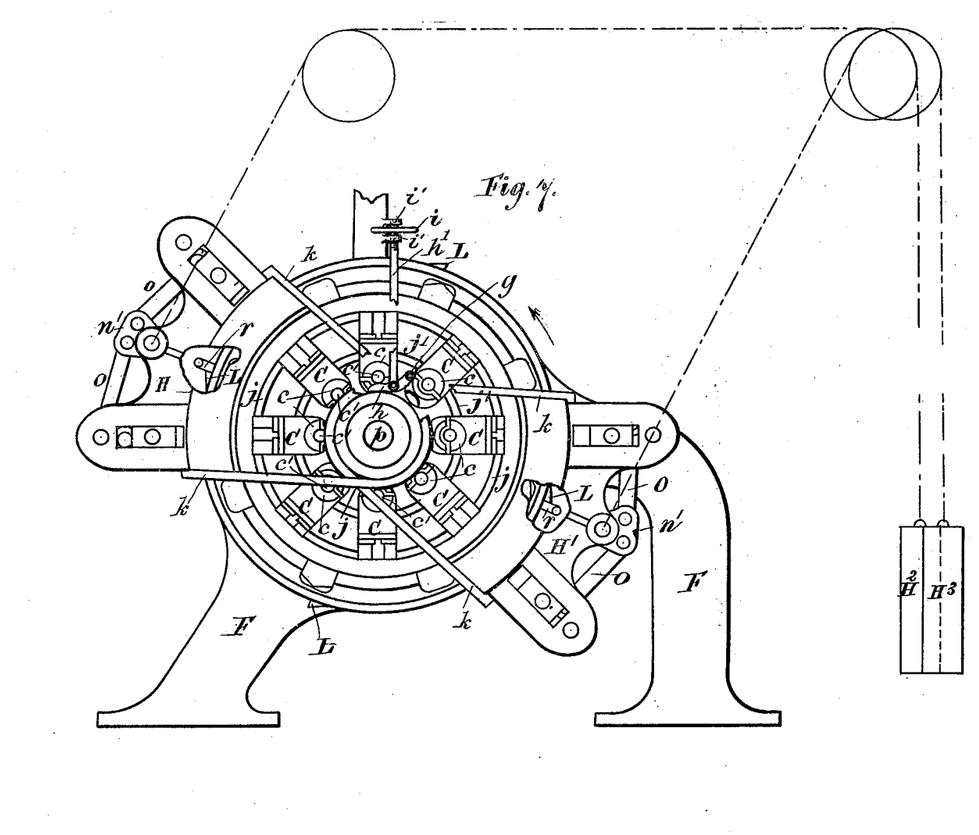
Figure 10:
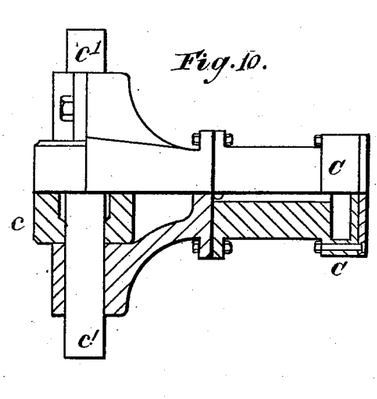
Fig. 10 is a front elevation, and Fig. 11 a side elevation, of bottom plunger.
Figure 11:
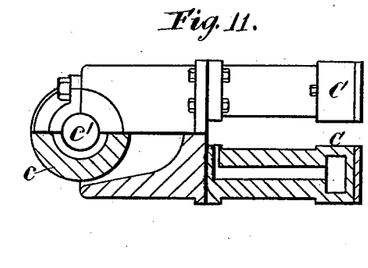
Figure 19:
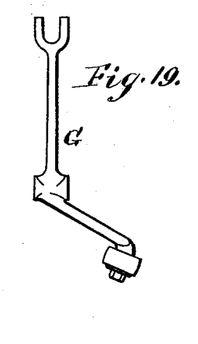

A is the cylinder, in which are placed the molds B at regular intervals around the circumference either singly or in pairs. The machine is preferably made, as shown in the drawings, with eight pairs of molds—that is, sixteen in all. Each pair of molds can be removed easily and separately, being constructed as shown in Figs. 8 and 9. They are held together by bolts $a$, and when in position the bolts $b$ keep them in their place.

C C represent the bottom plungers, which are each terminated by a roller $c$ to work on the central cam D.

$d$ are the slides for the bottom plungers. These slides are adjusted by set-pins $e$, acting on plates $f$.

E is the hopper, through which the molds are filled with material as they pass beneath it. The exact quantity is adjusted by means of a lever $h$, (or similar contrivance,) mounted on a pin $g$, fixed to the frame F and operated by a rod $h'$ and hand-wheel $i$, screwing on the upper end of said rod, the said rod $h'$ and hand-wheel $i$ being arranged in bearings $i'$ $i'$ on the hopper E. This regulates the depth that the bottom plunger falls as it passes the hopper E by the roller-spindle $c'$ coming onto the lever $h$, and so preventing the roller $c$ from reaching the cam to an extent depending on the operation of the hand-wheel $i$.

G is a rocking lever pivoted to the frame F and connected by rod G' to the pusher G². Such lever is worked by projections $j\,j'$, Fig. 7, on the cylinder-frame, thus causing the pusher G² to push off the bricks as they are finished.

Figure 1:
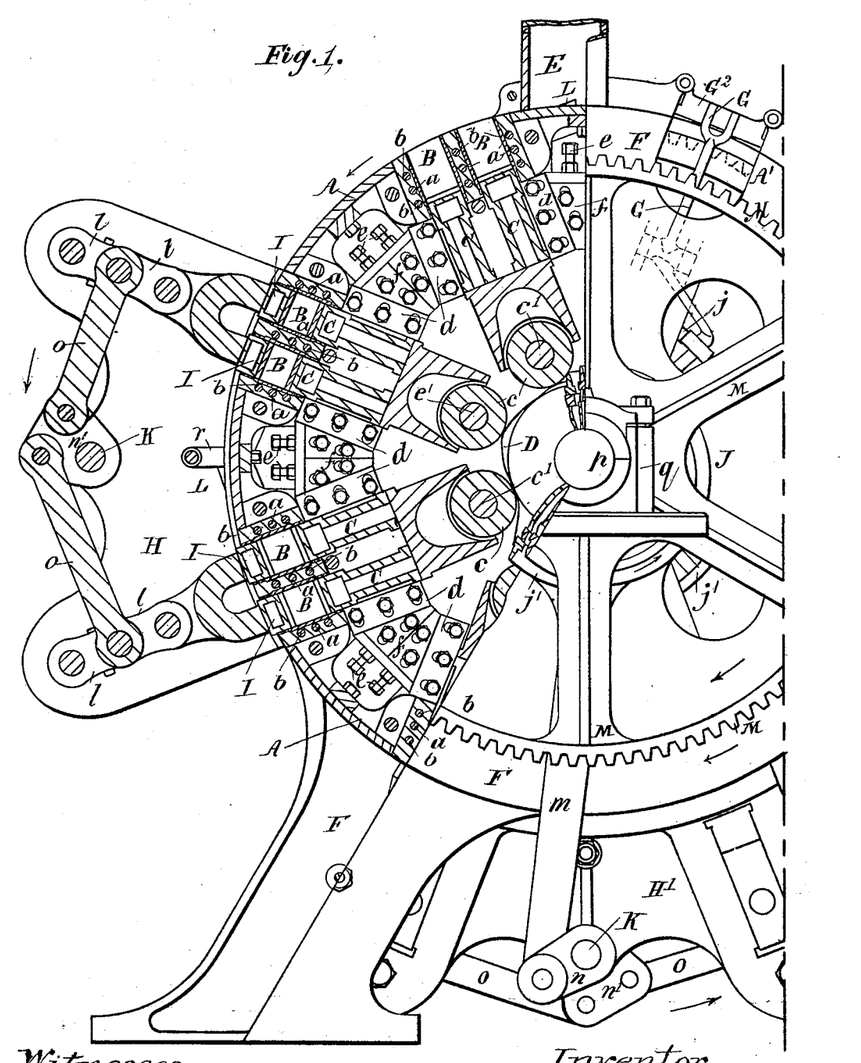
Figure 1 is an elevation of the machine, partly in section.
Figure 2:
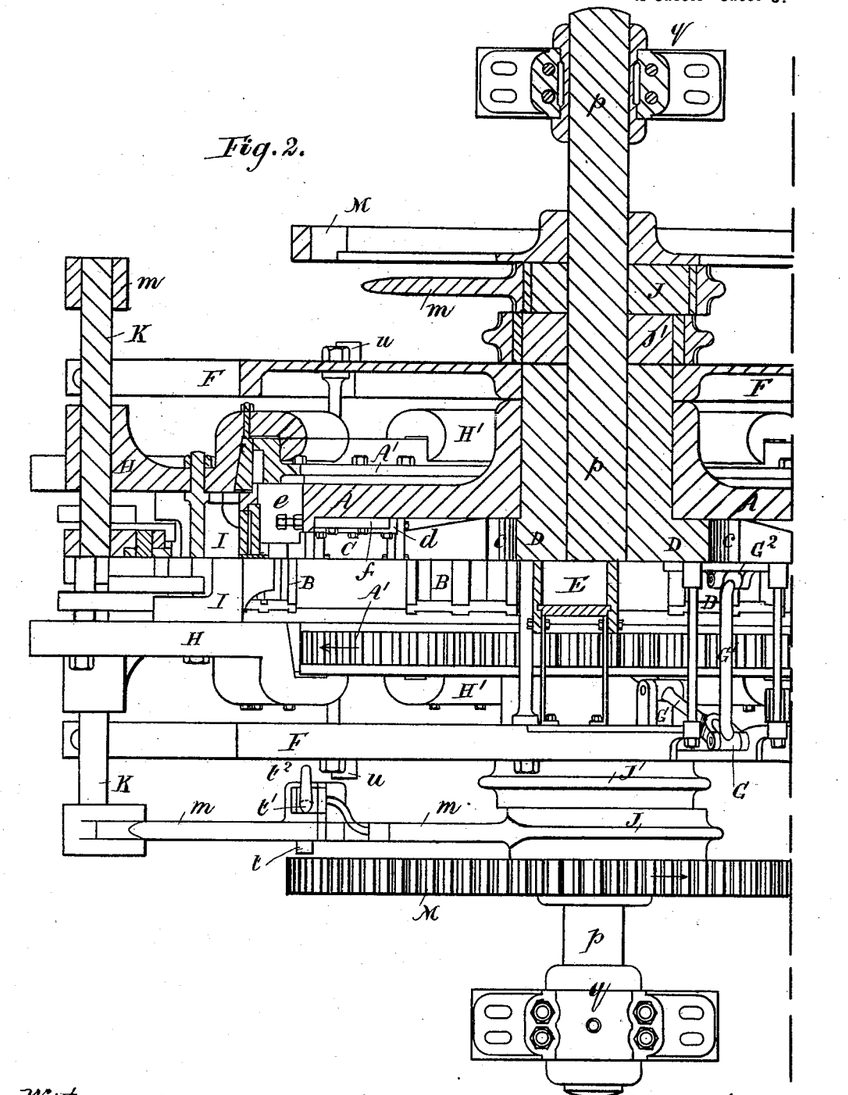
Fig. 2 is a plan of the same in semisection.

H H' are segments which carry the cross-heads K and toggle-levers $l$ and in which are formed the slides for the top plungers I. The toggle-levers $l$ are worked by the eccentrics J J' and arms $m$ through levers $n n'$ and connecting-rods $o$. The eccentrics J J' are set at the correct angle to each other and fastened to a shaft $p$, which passes through the central cam D, taking its bearings in the frame F and having also outside bearings $q$. These eccentrics are driven at the correct speed and in the right direction in relation to the cylinder (in this case four to one in the opposite direction) by outside gearing M M' M² M³, the wheel M being fixed on the shaft $p$, the wheels M' M² on the shaft $x$, and the wheel M³ on the driving-shaft $y$. The segments take their bearings on the edge of the cylinder and are tied to the center of the machine by straps $k$, as shown in Fig. 7. The segments H H' are counterbalanced by weights H² H³, (see Fig. 7,) so that the segment H is a little heavier than its weight H² and always tends to fall, and H' is a little lighter than its weight H³ and always tends to rise. The segment H at the commencement of its stroke is resting on one of the spring-catches L, arranged in the periphery of the cylinder (see Figs. 1, 16, and 17) by means of stop $r$ on segment-frame. As the cylinder revolves, therefore, the segment goes with it. Meanwhile the eccentrics are acting and the plungers do their work. When the end of the stroke is reached, the stud $s$ on the eccentric gear-wheel M comes in contact with spring-catch $t$ on eccentric-arm and carries the segment back to its original position at a speed of four times that of the cylinder. Then the short arm $t^2$ of the crank-lever $t' t^2$, connected with the catch $t$, meets a stud $u$ on the frame, and the crank-lever is thereby moved, so as to release the catch $t$ from the stud $s$, while the segment-stop $r$ has pressed down and passed over the next cylinder-catch L and now rests on it ready to commence its next stroke. The segment H' is operated in exactly the same way.

The cylinder A is rotated in the direction of the arrows by means of gearing A' A² A³ A⁴, the wheel A' being fixed to or forming part of the cylinder, the wheels A² A³ being fixed on the shaft $z$, and the wheel A⁴ being fixed on the shaft $x$.

Figure 3:
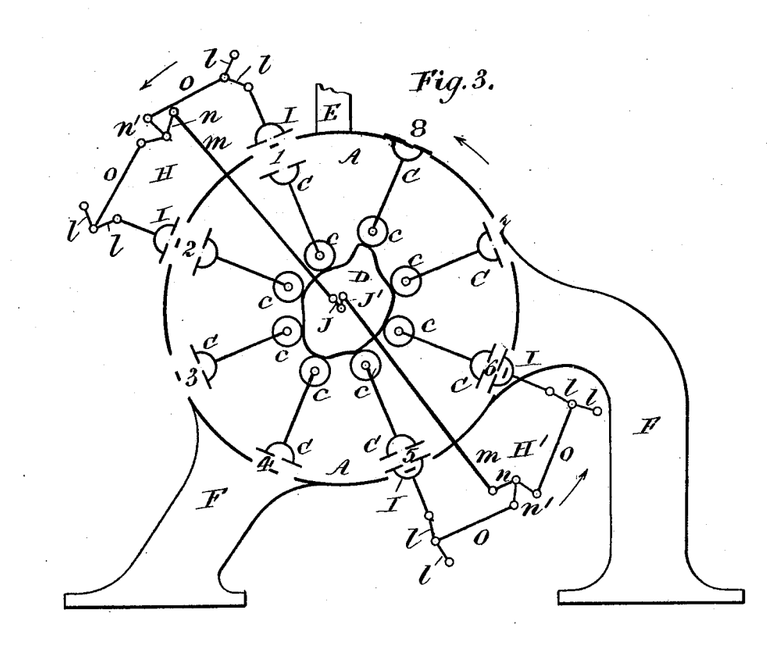
Figs. 3, 4, 5, and 6 are diagrammatical elevations showing the motions and positions of the various parts.
Figure 4:
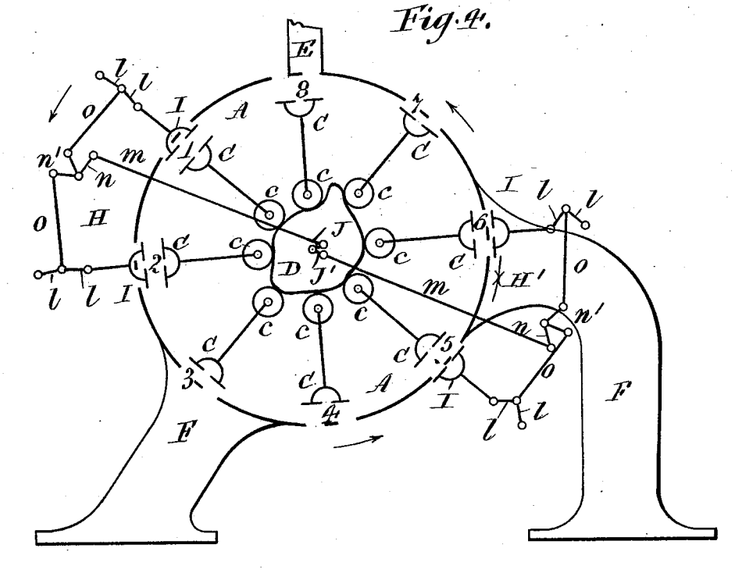
Figure 5:
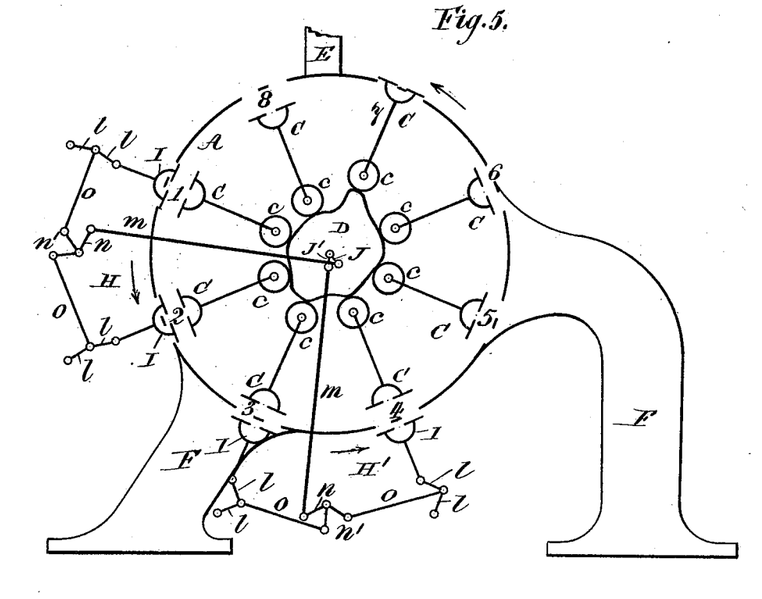
Figures 6, 18:
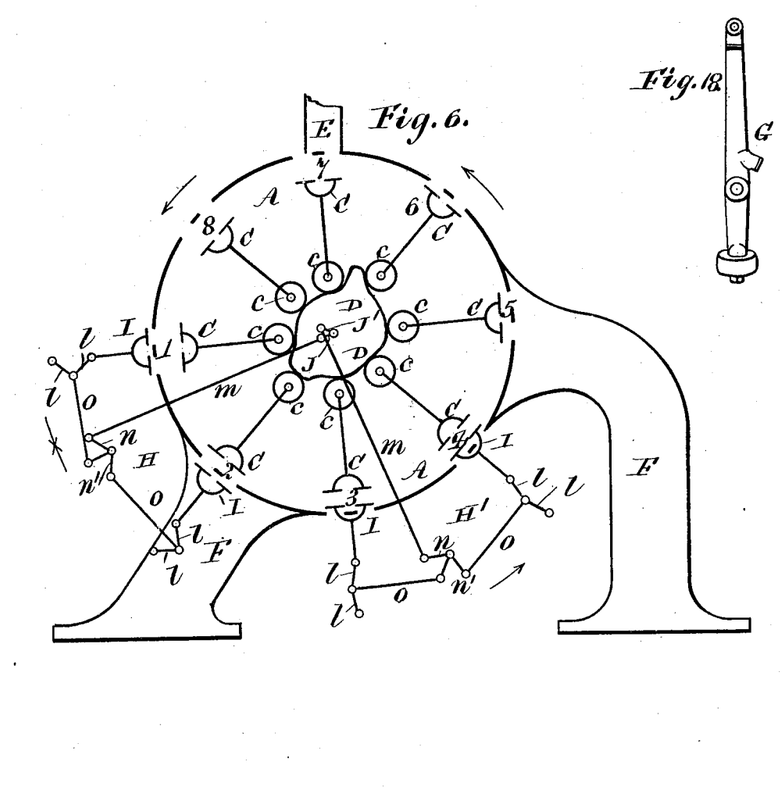
Fig. 18 is a front elevation, and Fig. 19 a side elevation, of rocking lever for operating the pusher.

Fig. 3 represents diagrammatically an elevation of the machine, showing the relative positions of the various parts in their first position, in which the molds 1 2, having been charged as they passed under the hopper E, are just ready to receive the top plungers I. The molds 3 and 4 have received their first pressure and 4 has just been pushed out to receive the second pressure. The molds 5 and 6 are receiving their second pressure and the molds 7 and 8 are finished. The bricks are just being delivered from the molds 8. In Fig. 4 the cylinder has traveled three-fortieths of a revolution in the direction of the arrows and the eccentrics three-tenths in the opposite direction. Molds 1 and 2 have commenced to receive their first pressure, 3 and 4 are ready to receive their second pressure, 3 having now also been pushed out, 5 and 6 are now finished, and the segment H' is just at the end of its travel (indicated by the double arrow) ready to be taken back by the eccentric's spur-wheel M, 7 is just having its completed brick pushed out to deliver it, and 8 is receiving its charge. In Fig. 5 the cylinder has traveled another twentieth of a revolution in the direction of the arrows and the eccentric a fifth in the opposite direction. Molds 1 and 2 have received the greater part of their pressure, 3 and 4 are just about to commence their second pressure, the segment H' having returned, 5 and 6 are finished, 7 is being delivered, and 8 has got its charge complete. In Fig. 6 the cylinder has traveled another three-fortieths of a revolution in the direction of the arrows and the eccentrics three-tenths in the opposite direction. Molds 1 and 2 have received their first pressure and the segment H has reached the end of its travel, as indicated by the double arrow, and is about to return, 3 and 4 are receiving their second pressure, 5 and 6 are finished, the bottom plunger of 6 is just rising to deliver, 7 is charging, and 8 is ready for its first pressure. This completes the cycle as Fig. 3 shows the cylinder after traveling another twentieth of a revolution, and by putting 7 and 8 in the place of 1 and 2 and so on it will give the correct positions of the various parts again.

What I claim as my invention, and desire to secure by Letters Patent, is—

1. In a brick-machine, the combination of a continuously-revolving cylinder, molds carried by said cylinder, bottom plungers for said molds, a central stationary cam for operating said plungers to give the bottom pressure and eject the brick, traveling oscillating segments and top plungers carried thereby to give the top pressure, rotating eccentrics, levers and toggle-levers connected with said eccentrics and carried by said segments and adapted to operate the top plungers, means for causing the segments to travel a certain distance with the cylinder, and means for causing them to return to their starting position, substantially as described.

2. In a brick-machine, the combination of a continuously-revolving cylinder, molds carried thereby, bottom plungers for said molds, a central stationary cam adapted to operate said bottom plungers, top plungers, traveling oscillating segments carrying said top plungers, weights attached to said segments and permitting them to travel in the same direction as the cylinder, means for returning the traveling segments, and rotating eccentrics, and levers and toggle-levers connected to said eccentrics and carried by said traveling segments and adapted to operate the top plungers, substantially as described.

3. In a brick-machine, the combination of a continuously-revolving cylinder, molds carried thereby, bottom plungers for said molds, a central stationary cam for operating said bottom plungers, top plungers, traveling oscillating segments carrying said top plungers, weights attached to said segments and permitting them to travel in the same direction as the cylinder, eccentrics mounted on a shaft concentric with the cylinder but rotating in the opposite direction thereto, and connecting rods and levers and toggle-levers carried by the oscillating segments and connected to said eccentrics and adapted to operate said top plungers, substantially as described.

4. In a brick-machine having a continuously-revolving cylinder, molds carried thereby, bottom plungers for said molds, and a central stationary cam for operating said bottom plungers, the combination of spring-catches mounted on said cylinder, with weighted traveling oscillating segments, top plungers carried by said segments, and levers, connecting-rods and toggle-levers to operate said top plungers, substantially as described.

5. In a brick-machine, the combination of a continuously-revolving cylinder, molds carried thereby, bottom plungers for said molds, a central stationary cam for operating said bottom plungers, traveling oscillating segments, top plungers carried by said segments, eccentrics for operating said top plungers mounted on a shaft concentric with the cylinder, a spring-catch on the cylinder to retard or regulate the movement of the traveling oscillating segments, studs on the eccentric gear-wheel to carry the segments back, and means for releasing them when they have arrived in their original position, substantially as described.

In testimony whereof I affix my signature in presence of two witnesses.

ADAM ADAMS.

Witnesses:
ARTHUR HILL,
PERCY FRED ROSE.